(12) United States Patent
Sanarico et al.

(10) Patent No.: US 11,371,446 B2
(45) Date of Patent: Jun. 28, 2022

(54) METHOD AND SYSTEM FOR MONITORING AN ENGINE CYLINDER IN AN INTERNAL COMBUSTION ENGINE, A METHOD AND DEVICE FOR CONTROLLING COMBUSTION IN SAID ENGINE CYLINDER AND AN IGNITION APPARATUS FOR AN INTERNAL COMBUSTION ENGINE

(71) Applicants: ELDOR CORPORATION S.P.A., Orsenigo (IT); FPT INDUSTRIAL S.P.A., Turin (IT)

(72) Inventors: Francesco Sanarico, Druento (IT); Pasquale Forte, Castiglione d'Orcia (IT); Alberto Grimaldi, Zola Predosa (IT); Roberto Pittatore, Turin (IT)

(73) Assignees: ELDOR CORPORATION S.P.A., Orsenigo (IT); FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 17/052,007

(22) PCT Filed: Apr. 23, 2019

(86) PCT No.: PCT/IB2019/053327
§ 371 (c)(1),
(2) Date: Oct. 30, 2020

(87) PCT Pub. No.: WO2019/211703
PCT Pub. Date: Nov. 7, 2019

(65) Prior Publication Data
US 2021/0239056 A1    Aug. 5, 2021

(30) Foreign Application Priority Data

May 2, 2018 (IT) .................. 102018000005010

(51) Int. Cl.
*F02D 35/02* (2006.01)
*F02D 41/00* (2006.01)
(Continued)

(52) U.S. Cl.
CPC ......... *F02D 35/021* (2013.01); *F02D 35/028* (2013.01); *F02D 41/0025* (2013.01); *F02P 5/1522* (2013.01); *F02P 2017/125* (2013.01)

(58) Field of Classification Search
CPC ...... F02D 35/02; F02D 35/021; F02D 35/028; F02D 35/00; F02D 35/0025; F02P 5/15;
(Continued)

(56) References Cited

U.S. PATENT DOCUMENTS 6,155,241 A * 12/2000 Hohner .................. F02P 17/12
123/406.24
9,651,453 B2 * 5/2017 Angeby .................. F02P 5/151
(Continued)

FOREIGN PATENT DOCUMENTS

| JP | 2000064938 A | 3/2000 |
|---|---|---|
| WO | 2005044382 A1 | 5/2005 |
| WO | 2013115712 A1 | 8/2013 |

OTHER PUBLICATIONS

International Search Report and Written Opinion dated Jul. 22, 2019 from counterpart International Patent Application No. PCT/IB2019/053327.

*Primary Examiner* — John Kwon
*Assistant Examiner* — Johnny H Hoang
(74) *Attorney, Agent, or Firm* — Shuttleworth & Ingersoll, PLC; Timothy Klima (57) ABSTRACT

A method for monitoring an engine cylinder in an internal combustion engine includes, for each engine cycle, detection of the ionisation current generated in the cylinder in a predetermined time interval of a combustion cycle, genera- (Continued)

tion of a signal representing the ionisation current and comparing a maximum value of the signal with a threshold value. Successively, the value of one or more parameters associated with the signal can be changed with respect to an equal number of corresponding reference values when the maximum value of the signal exceeds the threshold value, to reduce the maximum value of the signal in the time interval of a successive combustion cycle. The presence of water in the cylinder can be determined when the maximum value of the signal exceeds the threshold value for a predetermined first number of combustion cycles occurring within a predetermined period of time.

19 Claims, 4 Drawing Sheets

(51) Int. Cl.
*F02P 5/152* (2006.01)
*F02P 17/12* (2006.01)
(58) Field of Classification Search
CPC ... F02P 5/1522; F02P 5/1527; F02P 2017/125
See application file for complete search history.

(56) References Cited

U.S. PATENT DOCUMENTS

| | | |
|---|---|---|
| 2008/0065306 A1 | 3/2008 | Takahashi et al. |
| 2014/0336956 A1* | 11/2014 | Patti .................... F02D 41/2425 |
| | | 702/50 |

* cited by examiner

METHOD AND SYSTEM FOR MONITORING AN ENGINE CYLINDER IN AN INTERNAL COMBUSTION ENGINE, A METHOD AND DEVICE FOR CONTROLLING COMBUSTION IN SAID ENGINE CYLINDER AND AN IGNITION APPARATUS FOR AN INTERNAL COMBUSTION ENGINE

BACKGROUND OF THE INVENTION

This application is the National Phase of International Application PCT/IB2019/053327 filed Apr. 23, 2019 which designated the U.S.

This application claims priority to Italian Patent Application No. 102018000005010 filed May 2, 2018, which application is incorporated by reference herein.

The present invention relates to a method and system for monitoring an engine cylinder in an internal combustion engine, as well as a method and device for controlling combustion in said engine cylinder and an ignition apparatus for an internal combustion engine.

Thus, the present invention mainly applies to the automotive sector, particularly in perfecting systems for detecting and controlling the ionization current in engine cylinders.

In order to maximize engine performance, both in terms purely of performance and emissions, modern internal combustion engines for motor vehicles are provided with systems for analyzing the internal combustion process.

For example, the measuring of the ionization current is known for obtaining indicative information about combustion process parameters of the air-petrol mixture directly from the combustion chamber.

In particular, in certain solutions by the Applicant the spark plug is used as an ion sensor (typically of the type $CHO^+$, $H_3O^+$, $C_3H_3^+$, $NO_2^+$), which are created in the combustion chamber after the spark has been generated between the electrodes of the spark plug and combustion of the air-petrol mixture has occurred.

The detected current, known as "ionization current", is thus generated by applying a potential difference to the electrodes of the spark plug and measuring the current generated by means of the ions produced in the combustion chamber.

The current generated during a combustion cycle is divided into three different steps depending on the origin of the ions:
  Spark step: in which the ionization of the air/petrol mixture due to the peak in voltage causes the onset of the spark and a consequent peak in current;
  Chemical step: in which the generation of the ions is a consequence of the propagation of the flame front arising from the spark moving away from the spark plug;
  Thermal step: in which the generation of ions is a consequence of the intense heating of the combustion chamber.

By measuring such current, it is thus possible to detect the presence of intense oscillations in the pressure value inside the combustion chamber, which are generally associated with knocks or heavy knocks and which, being able to damage the engine, are treated with special control logics to safeguard the engine.

However, to date, the control systems in use do not allow the presence of water in the cylinders to be detected, an event which in determined environmental and climatic conditions, despite being generally infrequent, can be repeated with such frequency as to become difficult to manage.

In fact, due to the nature thereof, the water which tends to enter the engine cylinders typically originates from the condensation present in the suction tubes and consequently brings with it debris or dissolved substances, which, once inside the combustion chamber (in the cylinder) tend to recreate ion signal conditions similar to those of a heavy knock.

However, the control systems known to date do not allow the simple distinction of whether the ionization current increase inside the cylinder is caused by the presence of water or by cylinder malfunctioning.

SUMMARY OF THE INVENTION

Thus, it is an object of the present invention to provide a method and a system for monitoring the engine cylinder in an internal combustion engine, as well as a method and device for controlling combustion in said engine cylinder, which overcome, at least in part, the problems of the aforesaid prior art.

In particular, it is an object of the present invention to provide a method and system for monitoring the engine cylinder in an internal combustion engine, which are highly reliable and easily implementable.

Furthermore, it is an object of the present invention to provide a method and device for controlling combustion in said engine cylinder, which are optimized and which allow the detection of a presence of water in an engine cylinder of an internal combustion engine It is a further object of the present invention to provide an ignition apparatus for an internal combustion engine provided with a plurality of cylinders, which are high-performing both in terms of emissions and performance.

Said objects are achieved by a method for monitoring an engine cylinder of an internal combustion engine; by a method for controlling combustion in said engine cylinder; by a system for monitoring an engine cylinder of an internal combustion engine; by a device for controlling combustion for said engine cylinder; and by an ignition apparatus for an internal combustion engine; as disclosed herein.

The monitoring method comprises the implementation, for each engine cycle, of a series of steps in succession.

In particular, a detection of the ionization current generated in the cylinder in a predetermined interval of time of a combustion cycle is comprised.

Preferably, the generation of a first signal representative of said detected ionization current, is comprised.

A comparison is then made of a maximum value of said first signal with a pre-set threshold value.

Note that the first signal is representative of the ionization current in the predetermined interval of time, consequently, the maximum value is also to be considered within the same interval of time (which preferably corresponds to the thermal step).

Then a change is envisaged in the value of one or more parameters associated with said first signal with respect to an equal number of corresponding reference values (e.g. base map) when said maximum value of the first signal exceeds said threshold value, in order to reduce the maximum value of said first signal in said predetermined time interval of a successive combustion cycle.

According to the invention, the method comprises an identification of a condition of the presence of water in the cylinder when said maximum value of the first signal exceeds said pre-set threshold value for a predetermined first number of combustion cycles, which are preferably successive and occurring within a predetermined period of time. In other words, the method comprises sampling the maximum of a signal representative of the value of the ionization current measured in the aforesaid interval of time of the combustion cycle, comparing it to a pre-set threshold value.

If the maximum value of the signal remains "unaltered" between two successive cycles, in the sense that it exceeds said threshold value despite the change in said one or more parameters after said first comparison, this implies that the change in such at least one parameter has an insufficient influence on the trend of the first signal by virtue of the presence of water in the combustion chamber.

In the ionization current trend, the Applicant has thus identified the most reliable parameter in order to be able to identify the presence of water in the engine cylinder, also allowing such phenomenon to be distinguished from the phenomenon of heavy knocking.

In fact, by studying the problem, the Applicant has identified the persistence of the "knock" phenomenon as one of the main differences between a real knock, which is occasional and can be quickly eliminated with changes in opportune parameters, and the presence of water, which is followed by an increase in ionization current, which is persistent and cannot be eliminated by changes in parameters, which do not distance the value excessively from the base map (i.e. reference value).

In fact, the water present in the cylinder raises the intensity of the ionization current (and with it the peak thereof) in such an elevated manner that any action deemed "plausible" to recalibrate the signal, is pointless and does not allow the first signal to return to "threshold".

As regards the parameters, they preferably comprise at least one coefficient of amplification of the detected ionization current.

A further aspect of the invention regards the capacity of the method not only to detect the presence of water, but also to establish when it is time to reinstate normal working conditions.

Thus, preferably, the method comprises the detection of an absence of water from the engine cylinder when, upon said detection of the presence of water, the maximum value of the first signal is lower than said threshold value for a predetermined second number of consecutive cycles.

More preferably, in order to make the control more stable, the second number of cycles is greater than the first number of cycles.

Note that the first and the second number are to be considered "homogeneous" since each change in the parameters occurs inside a single engine cycle, which is why the two numbers are comparable.

According to a further aspect of the present invention, said one or more parameters could also comprise one or more combustion control parameters.

In this case, the monitoring method can be considered, to all intents and purposes, a method for controlling combustion, which is also the subject of the present invention.

In fact, such control method, like the monitoring method, comprises detecting the ionization current generated in the cylinder in a predetermined time interval of a combustion cycle (i.e. in the thermal step), generating a first signal representative of said detected ionization current and comparing a maximum value of said first signal with a pre-set threshold value.

A change in the value of one or more combustion control parameters is also envisaged with respect to an equal number of corresponding values of reference when said maximum value of the first signal exceeds said threshold value in order to reduce the maximum value of the ionization current in said predetermined time interval of a successive combustion cycle.

Those magnitudes or parameters, which, on varying, impart a change corresponding to the physical phenomenon of combustion, are considered combustion control parameters.

According to one aspect of the present invention, the identification of a condition of the presence of water in the cylinder is provided when said maximum value of the first detected signal exceeds said pre-set threshold value for a predetermined first number of combustion cycles occurring within a predetermined period of time.

Furthermore, preferably, upon said identification of the presence of water in the cylinder, an elimination of said changes in said one or more previous combustion control parameters is provided, so as to bring said one or more parameters back to the values of reference.

Advantageously, thus, this prevents changes imparted "erroneously" to the engine control parameters in the comparison step (for example mistaking the ionization current peak for a knock) from being eliminated after determining that the cause of the peaks is the presence of water.

For example, in one preferred embodiment, said one or more parameters comprise the ignition timing.

Therefore, such selection criteria enables the method, which is the subject of the invention, to be exploited for distinguishing between knocking events, which are usually random and not repeated, despite causing ionization current peaks (as they tend to finish in a few engine cycles), and the presence of water, which, due to the nature thereof, enters the cylinders suddenly and tends to stagnate for long periods of time.

Advantageously, thus, a method is obtained which allows the control/processing unit, which actuates it, to "decide" autonomously the working conditions when intervention (knock) is required and the working conditions when it is opportune to leave the operating parameters unaltered with respect to the base map (presence of water).

A system for monitoring an engine cylinder of an internal combustion engine, preferably, but not exclusively, capable of actuating the aforesaid monitoring method, is also the subject of the present invention.

In use, such system is associated with an ignition coil comprising circuitry associated with a spark plug inserted in said engine cylinder for generating an ignition spark.

The system of the invention preferably comprises a detection circuit configured to detect the ionization current, which is generated in the cylinder in a predetermined time interval (preferably the thermal step) during a combustion cycle and to generate a first signal representative of said detected ionization current.

With every combustion cycle, the control unit is configured to compare a maximum value of the first signal with a pre-set threshold value and change the value of one or more parameters associated with said first signal with respect to an equal number of corresponding reference values when said maximum value of the first signal exceeds said threshold value, in order to reduce a maximum value of the first signal in said predetermined time interval of a successive combustion cycle.

According to one aspect of the invention, the processing unit is further configured to activate a water detection mode in the cylinder when said maximum value of the first signal exceeds said pre-set threshold value for a predetermined first number of successive combustion cycles.

Preferably, when the processing unit is in the water detection mode, it is programmed to bring the value of said one or more parameters associated with the first signal back to the corresponding values of reference (i.e. base map).

Furthermore, in such mode, the processing unit is configured to compare, during every engine cycle, said value of the ionization current with a pre-set threshold value, preferably keeping the value of said one or more parameters equal to the corresponding reference value until identification of the absence of water in the cylinder.

In this regard, preferably, the water detection mode is deactivated when the comparison between the maximum value of the first signal and the threshold value gives a "positive" result (i.e. maximum value of the signal lower than the threshold value) for a predetermined second number of consecutive combustion cycles, preferably greater than the first number of cycles.

Advantageously, in such mode the deactivation of the water detection mode requires a sufficiently long temporal transient to guarantee the stability of the control/monitoring.

In fact, due to the nature thereof, the water could enter and exit the cylinder several times after a series of bends/hairpin turns of the vehicle, only because of the centrifugal force, which, in the absence of a sufficiently long "invalidation" transient could lead to a continuous conversion between the nominal operating mode, the knock correction mode and the condition of the presence of water mode, with considerable stress on the system in terms of potential overheating of the parts at the exhaust and a reduction in efficiency.

Note that the parameters associated with the first signal can be purely "virtual" parameters, such as, for example gains linked to the amplification of the first signal (i.e. of the detected current signal), or "physical", i.e. in some way impacting on the engine cycle; in this last case, the monitoring system can be used in a combustion control device, which is also the subject of the invention.

In this case, the control device is configured to activate a knock correction mode when the processing unit detects a value of the first signal greater than the threshold value.

Combustion cycle control parameters are changed in such knock correction mode, such as for example the angle of rotation of the drive shaft and/or a position of the piston, both representative of the ignition timing of the respective cylinder, in order to reduce the ionization current developing during combustion.

However, when the water detection mode is activated, the knock correction mode is deactivated and the changes in parameters implemented with activation of such mode are cancelled.

Advantageously, in this way, the interventions made on the first exceedance of the threshold value by the first signal, which is interpreted by the processing unit as a knock event, are cancelled as they are unjustified in the light of the real nature thereof, relating to the presence of water in the combustion chamber.

BRIEF DESCRIPTION OF THE DRAWINGS

These and other features of the present invention together with the relative advantages will be further clarified by the following description given by way of example, which is consequently not limiting, of a preferred embodiment, which is thus not exclusive, of a method and system for monitoring the engine cylinder in an internal combustion engine, as well as a method and device for controlling combustion in said cylinder according to what is illustrated in the accompanying drawing tables, wherein.

DETAILED DESCRIPTION OF THE INVENTION

With reference to the appended figures, an ignition apparatus for an internal combustion engine according to the present invention is indicated with number 1.

Figure 1:
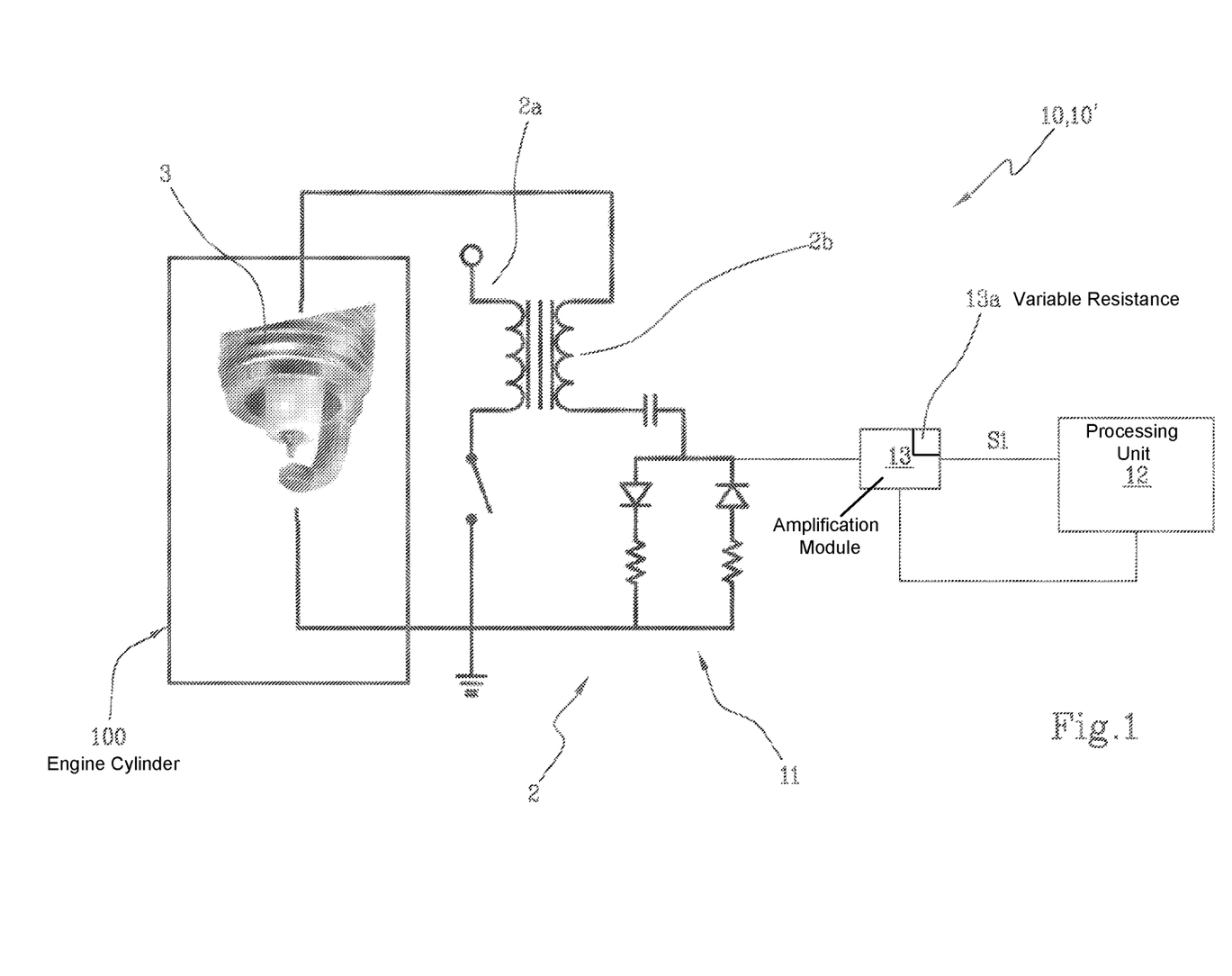
FIG. 1 shows a schematic view of the system for monitoring (and controlling) an engine cylinder of an internal combustion engine according to the present invention.

Ignition apparatus 1 therefore refers to an assembly provided with at least one ignition coil 2 equipped with circuitry 2a, 2b associated with a spark plug 3.

In particular, the coil 2 comprises a primary coiling 2a with a first terminal connected to a battery voltage and a second terminal connected to the piloting driver and the driver of a secondary coiling 2b with a terminal connected to a spark plug 3, each inserted in a respective engine cylinder 100 for generating an ignition spark.

Note that, usually, an internal combustion engine for automotive use comprises a plurality of cylinders 100.

Thus, in this regard, the apparatus 1 comprises a plurality of ignition coils 2, proportionate in number to the number of engine cylinders 100.

Preferably, the apparatus 1 comprises a number of ignition coils 2 equal to the number of engine cylinders 100, each associated with a spark plug 3 thereof inserted in the cylinder.

According to one aspect of the present invention, the apparatus comprises a system 10 for monitoring combustion of the engine cylinder 100, preferably in all engine cylinders 100.

It should be noted that the system 10 can also be implemented on already existing coils 2 and thus, it is the subject of the present invention independently of the apparatus.

Figure 2:
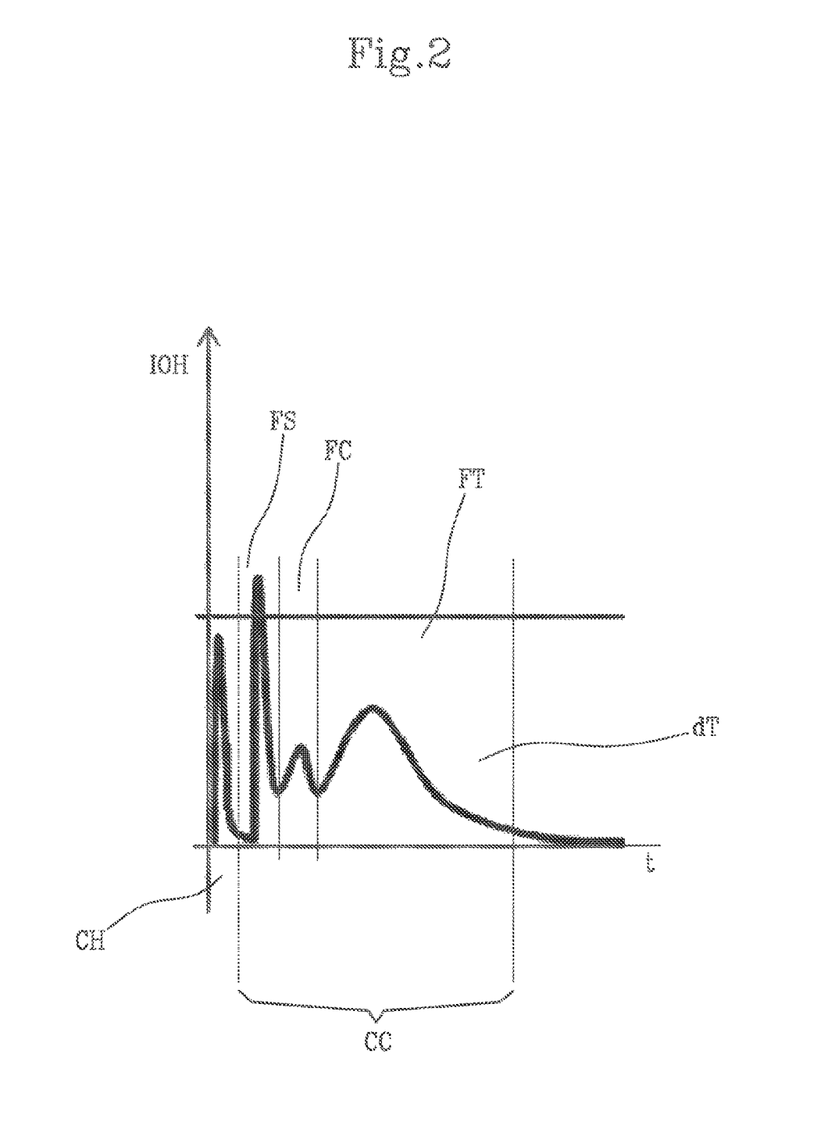
FIG. 2 schematically shows a general trend of the ionization current during a combustion cycle.

The system 10 comprises a circuit 11 for detecting the ionization current ION, which is generated in one of the cylinders in a predetermined time interval dT in a combustion cycle and a processing unit 12 associated with circuit 11.

It should be noted that, preferably, the expression "ionization current ION" defines the current which is generated in the secondary coiling as a consequence of the ionization, which consequently defines the measurement parameter thereof.

However, in the spirit of the present invention, the circuit 11 is generally conceived to measure/detect ionization as a phenomenon, which is why other possible circuits/devices must also be included in the same for detecting/measuring ionization, which are different from the circuit 11 but capable of detecting the intensity thereof.

Generally, the trend of the ionization current ION in the combustion cycle (indicated as CC in FIG. 2) comprises:

a "spark step" (indicated as FS in FIG. 2), in which the generation of the spark occurs and to which an elevated ionization current peak ION corresponds, a "chemical step" (indicated as FC in FIG. 2), in which the generation of the ions is a consequence of the propagation of the flame front originating from the spark; in such chemical step the ionization current ION starts to rise again after the rapid drop occurring after the spark, reaching a new maximum value (typically lower than the peak due to the spark) and then it decreases again;

a "thermal step" (indicated as FT in FIG. 2), in which the generation of ions is the consequence of the intense heating of the combustion chamber and the ionization current ION correlated thereto starts to rise again reaching a further maximum value and then it decreases again until the end of the cycle.

Therefore, the combustion step generally comprises three ionization current ION maximums, a first maximum or peak due to the spike in current, linked to the spark, a second maximum, lower than the peak, linked to the chemical step and a third maximum, linked to the thermal step, which, in normal conditions, is lower than the second.

Note that, prior to the spark step, the ionization current reaches a further peak linked to the charging step (indicated with CH in FIG. 2) of the primary coiling of the coil 2.

Conventionally, in this text, such step is considered outside the combustion cycle, but nothing would stop this from being considered, too.

Preferably, the interval of time dT in which the detection occurs is contained in the "thermal step" of the combustion cycle.

Preferably, however, the detection circuit 11 is configured to detect the ionization current ION in the whole combustion cycle, from the spark step to the thermal step.

The detection circuit 11 is further configured to generate a first signal S1 representative of said detected ionization current ION, at least in the time interval dT.

Preferably, the first signal S1 is physically coherent with the trend of the ionization current ION in the time inside the cylinder 100; in other words, preferably, the first signal has a trend in time corresponding to the trend of the ionization current in time, despite being shifted according to one or more coefficients.

Therefore, such first signal S1 preferably has a trend, which is similar to that of the ionization current, at least in the thermal step (therefore, first increasing and then decreasing).

The processing unit 12 is thus designed to receive the first signal S1 from the circuit 11.

Preferably, the processing unit 12 is thus configured to compare, with every engine cycle, to compare, with every combustion cycle, a maximum value of the first signal S1 in the interval of time dT with a pre-set threshold value TR.

Note that the expression "maximum value" is understood, in this text, to define not necessarily the maximum peak reached by the first signal, but preferably any maximum point (mathematical) in the interval.

In any case, in the spirit of the present invention, any kind of comparison is included which makes it possible to verify whether the first signal S1 exceeds the threshold value TR in the predetermined time interval dT or not, also potentially without a maximum value being used directly.

Generally, the pre-set threshold value TR is a lower value than the values which can be reached by the ionization current ION in the case of knock or the presence of water, preferably defining a signal saturation limit.

Figure 3:
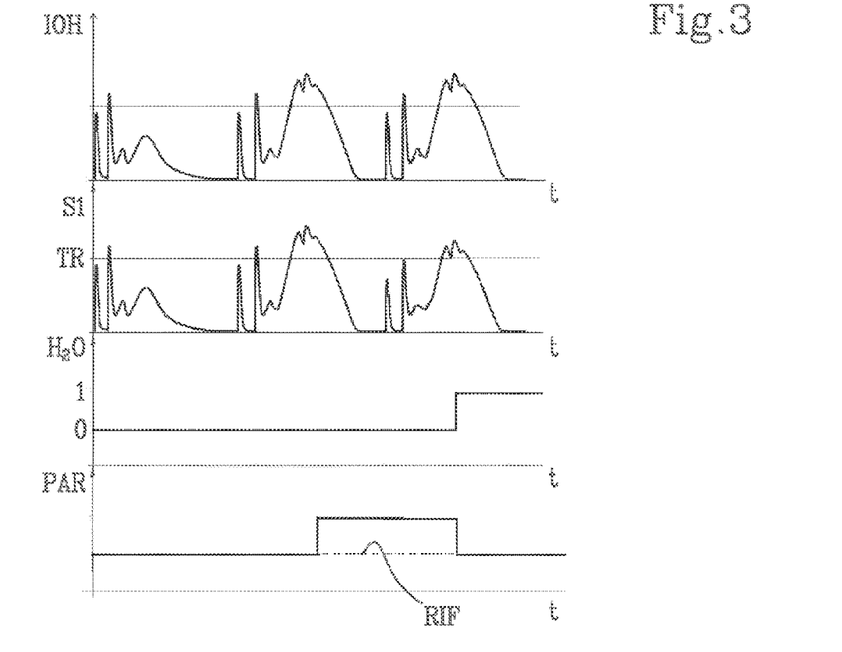
FIG. 3 schematically shows the graphs representing the trend of the reference magnitudes for the monitoring method of the present invention.

The processing unit 12 is further configured to change the value of one or more parameters (generally indicated with PAR in the figures) associated with the first signal S1, with respect to an equal number of corresponding reference values REF, when said maximum value of the first signal S1 exceeds said threshold value TR.

In particular, such change is implemented with the object of reducing the maximum value of the first signal S1 in the pre-set interval of time dT (preferably in the thermal step) of a successive combustion cycle.

In a first embodiment, said one or more parameters associated with the first signal S1 comprise at least one coefficient of amplification of the detected ionization current ION.

Such coefficient of amplification is a "gain", which is applied to the ionization current value ION, concretely fluent in the cylinder, in order to assist the reading thereof.

In this regard, note that, if the coefficient of amplification was a negative sign, the first signal would have a specular trend (not coherent) to that of the ionization current and the minimum value thereof would correspond to the maximum point of the current.

It is understood that the method according to the present invention also applies to such eventuality simply by evaluating the exceedance, in negative, of a minimum threshold value or by analyzing the absolute module/value of the first signal.

In fact, what it detects is that the value of the first signal at the time of the "peak" in the ionization current, in the thermal step of the combustion cycle, does not exceed, in positive or in negative, a determined threshold.

In the case of the coefficient of amplification, the change imparted by the processing unit 12 thus acts on the value of the first signal S1 without interfering with the real value of the fluent ionization current ION in the cylinder 100.

In this regard, preferably, the detection circuit 11 comprises (or is associated with) at least one amplification module 13 of the signal of the ionization current ION.

In the preferred embodiment, the amplification module 13 is provided with one variable resistance 13a. A change in the gain applied to the ionization current ION and thus a corresponding change in the trend of the first signal S1 corresponds to a change in the resistance value.

Thus, the resistance value 13a is one of said parameters associated with the first signal S1 on which the processing unit 12 acts when the maximum value of the first signal S1 exceeds the threshold value TR.

Preferably, the amplification module 13 comprises a plurality of resistances, which are operatively parallel to one another (shunt).

Such resistances have different values, which allow the signal of the ionization current ION to be modulated, keeping it in an interval compatible with the instrumentation.

The processing unit 12 is thus configured to change the value of said resistance 13a in order to reduce the value of the ionization current ION when said value of the ionization current ION exceeds said pre-set threshold value TR.

By way of example, if the value of the first signal S1, expressed in mV, exceeds the threshold value of 4000 mV, the system reacts by acting on the resistance, modifying the shunt.

According to one aspect of the present invention, the processing unit is configured to activate a water detection mode in the cylinder when said maximum value of the first signal S1 exceeds said pre-set threshold value TR for a predetermined first number of successive combustion cycles.

In other words, if, after successive changes (preferably consecutive) and agreements, the value of the first signal S1 continues to exceed the aforesaid predetermined threshold value TR, the processing unit 12 activates the water detection mode.

In any case, the present method is also valid when the change in the at least one parameter does not occur in consecutive cycles, (although such eventuality is preferable) but, for example, it is possible to comprise that a change is made every two or three cycles, thus slowing down the detection of the presence of water in the cylinder.

Preferably, the first number of combustion cycles is quantified in a number from 2 to 10 engine cycles.

Therefore, when the processing unit 12 detects a persistent exceedance of the threshold value TR of the first signal S1 in a determined cylinder although, in the previous combustion cycles, the monitoring system 10 had acted by changing the opportune parameters, the presence of water is detected in the cylinder.

Such control logic bases the foundation thereof on the substantial implausibility of events capable of persistently raising the value of the ionization current inside the cylinder, "explaining" the continuous exceedance of the threshold value TR with the increased quantity of ions caused by the debris present in the water ingested by the cylinder.

Note that, preferably, the processing unit 12 is configured to activate the water detection mode also on detecting the exceedance of the threshold value TR of the first signal S1 in several engine cylinders simultaneously or in rapid succession.

In other words, if the water passes quickly between one cylinder and the next, a condition may arise in which the saturation (or exceedance of the threshold) of the first signal S1 is detected in more than one cylinder simultaneously or in succession.

Such condition is also interpreted by the processing unit as a symptom of the presence of water in the corresponding cylinders, for which the relative mode is activated.

Furthermore, preferably, upon said activation of the water detection mode in the cylinder 100, the processing unit 12 is programmed to bring the value of said one or more parameters PAR back to the corresponding reference values REF.

In particular, with reference to the coefficient of amplification, the processing unit 12 is configured to bring the value of the same (i.e. of the resistance 13*a*) back to a map value for the engine operating conditions.

Advantageously, in this way, the corrections made by the monitoring system in the initial hypothesis that the peaks of the first signal S1 were caused by knock events or similar are eliminated, waiting for the water in the cylinder to exit, without further interventions on the combustion and/or measurement parameters.

In this regard, preferably when the water detection mode in the cylinder is active, the processing unit 12 is configured to keep the value of said one or more parameters of the combustion cycle equal to the corresponding reference values REF; this is independently of any further exceedances of the threshold value TR by the first signal S1 in successive combustion cycles.

Figure 5:
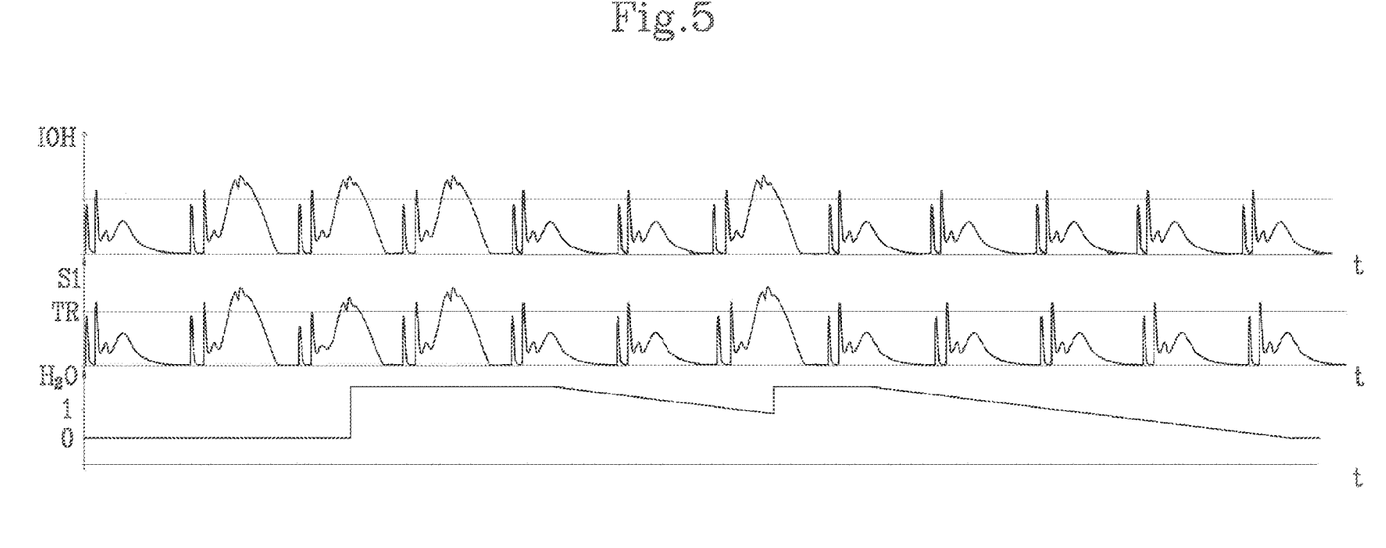
FIG. 5 schematically shows the trend of some of the magnitudes in FIG. 3 in a time interval of greater duration.

Furthermore, preferably, the processing unit 12 is configured to deactivate the water detection mode in the cylinder when said maximum value of the first combustion signal S1 is lower than said pre-set threshold value TR in the predetermined time interval dT (i.e. in the thermal step) of a predetermined second number of consecutive combustion cycles.

Said second number of cycles defines an invalidation or deactivation transient of the water detection mode.

Preferably, such second number of combustion cycles is greater than said first number of cycles, preferably at least five times greater.

In the preferred embodiment, the second number of engine cycles is from 255 to 100, more preferably equal to about 200.

Operatively, if, for a determined number of combustion cycles lower than the second number, the maximum value of the first signal S1 (in the predetermined time interval dT) is kept below the threshold value TR, but successively a cycle occurs in which such value exceeds the threshold value TR, the processing unit 12 is kept in the water detection mode, zeroing the count of the combustion cycles in the invalidation transient.

Advantageously, in this way, the monitoring system 10 is highly stable and calibrated in relation to the characteristics thereof of the phenomenon of water entering the engine (rapid ingestion, slow and irregular disposal).

A device for controlling 10' combustion in an engine cylinder 100 of an internal combustion engine is also the subject of the present invention.

Such control device 10' substantially comprises the features of the monitoring system 10 described thus far, with the variant of comprising, among said one or more parameters associated with the first signal S1, at least one combustion control parameter.

Preferably, the control device 10' comprises a detection circuit 11 similar to the one previously described and a processing unit 12 configured in a highly similar manner, the features of which can be used in the description of the control device 10' mutatis mutandis. Therefore, the technical features and numbers of reference used previously in the description of the monitoring system 10 will also be valid for the subsequent description of the control device 10', except where specified.

Note that the use of a combustion control parameter (active) allows the device 10' to mutually combine the monitoring/detection of the presence of water with a knock control inside the cylinder 100.

Figure 4:
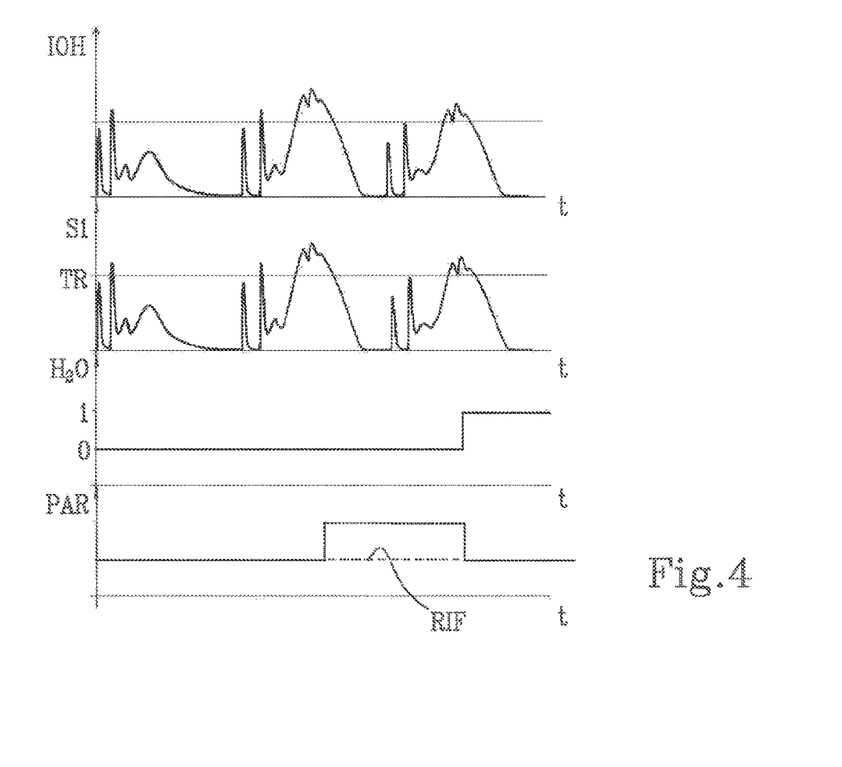
FIG. 4 schematically shows the graphs representing the trend of the reference magnitudes for the control method of the present invention.

In fact, the processing unit 12 is preferably configured to activate a knock correction mode when (during the comparison) the value of the first signal S1 detected exceeds the threshold value TR.

Such knock correction mode is activated with the object of reducing the maximum value of the ionization current ION in the successive combustion cycle, consequently lowering the maximum value of the first signal S1 correlated thereto below the threshold value TR (see the reduction of the current values ION in FIG. 4).

Thus, in the knock detection mode, the processing unit 12 is configured to change the value of one or more combustion cycle control parameters with respect to one or more corresponding values of reference REF.

In the preferred embodiment, the ignition timing of the cylinder 100 is present among the combustion control parameters managed by the processing unit 12.

In other words, said at least one combustion control parameter comprises an angle of rotation of the drive shaft and/or a position of the piston, both representative of the ignition timing of the respective cylinder.

By way of example, in relation to a knock event, the system may request a subtraction, which goes from about −1° engine to about −5° depending on the intensity of the event. If the knock occurs with a high frequency, the advance subtractions can be accumulated up to a maximum value, which can reach about −15°.

Therefore, in this regard, when the processing unit 12 is in the knock correction mode, it is configured to reduce said angle or modify said position with respect to the corresponding reference values REF each time said maximum value of the first signal S1 in the predetermined time interval dT of the combustion cycle (i.e. in the thermal step) exceeds said threshold value TR. The ignition timing of the successive combustion cycle of a predetermined angle is thus reduced.

In this way, the generation of the spark is delayed, reducing the thermal increase dictated by the (temporal) length of the combustion, which already avails of the overheating occurring in the chamber in the previous combustion.

In the case of a real knock, this should allow any knock effect to be eliminated in a limited number of cycles.

However, if the reason for the increased ionization current ION is not to be found in the presence of water in the cylinder 100, a reduction of the ignition timing does not entail a sufficient reduction of the maximum value of the first signal S1.

Consequently, when the processing unit 12 detects that the maximum value of the first signal S1 exceeds said pre-set threshold value TR for a predetermined number of successive combustion cycles, it activates the water detection mode in the cylinder.

Simultaneously (or consequently), once the water detection mode is activated, the processing unit 12 brings the ignition timing value back to the corresponding value of reference.

Preferably, in the water detection mode, the control device 10' or the processing unit 12 deactivates the knock correction mode.

Advantageously, similar to what was described above, this allows the value of the combustion control parameter to be kept equal to the reference value, preventing successive exceedances of the threshold value TR by the first signal from introducing new parameter changes.

A monitoring method and a method for controlling combustion for an engine cylinder of an internal combustion engine provided with an ignition coil are also the subject of the present invention, as already previously discussed.

Such methods are preferably, but not exclusively, actuated by the monitoring system and by the control device described thus far.

In any case, everything described in relation to the system 10 and to the device 10', if compatible with the actuation of the monitoring and control methods according to the present invention, is applicable mutatis mutandis to what is reported below.

With reference to the monitoring method, it comprises, in the first instance, the detection of the ionization current ION, which is generated in the cylinder 100 in the predetermined interval of time dT of the combustion cycle (preferably in the previously described thermal step).

Thus, the first signal S1 is generated, which is representative of the detected ionization current ION.

Everything described previously in relation to the first signal S1 is also to be considered valid for anything that regards the method according to the present invention.

A comparison of a maximum value of said first signal S1 is then comprised with a pre-set threshold value TR.

Note that the maximum value of the first signal S1 is to be considered the maximum value in the first signal S1 portion corresponding to the trend of the ionization current ION in the predetermined interval of time dT, i.e. in the thermal step.

When it emerges from said comparison that the maximum value of the first signal S1 exceeds said threshold value TR, the method comprises implementing a change in the value of one or more parameters associated with said first signal S1, with respect to an equal number of corresponding reference values REF, in order to reduce the maximum value of said first signal in the predetermined time interval dT (i.e. in the thermal step) of a successive combustion cycle.

In a first embodiment, said one or more parameters comprise "virtual" values, which change the value of the first signal S1 without intervening on the phenomenon of combustion inside the cylinder.

For example, said one or more parameters could comprise a coefficient of amplification of the detected ionization current ION.

Alternatively, or jointly, said one or more parameters could comprise a combustion control parameter (active).

In such embodiment, the method, which is the subject of the present invention, becomes a true combustion control method as the change in the aforesaid parameter actively modifies the combustion process.

Preferably, in such embodiment, the step of changing the combustion control parameter comprises identifying the onset of a heavy knock inside the cylinder 100 when the maximum value of the first signal S1 exceeds said threshold value TR and changing said one or more combustion control parameters upon said identification of the heavy knock.

Preferably, the combustion control parameter is defined by the ignition timing.

The step of changing said one or more combustion control parameters comprises implementing a reduction of said ignition timing of a predetermined timing angle (or a predetermined cylinder travel) for the successive combustion cycle.

According to one aspect of the present invention, both the control method and the monitoring method comprise identifying a condition of the presence of water in the cylinder 100 when said maximum value of the first signal S1 exceeds said pre-set threshold value TR for a predetermined first number of combustion cycles occurring in a predetermined period of time.

In other words, in a combustion cycle after said parameter change (preferably in the successive combustion cycle) a new detection of the ionization current ION generated in the cylinder in the thermal step is made, as well as a new comparison step.

If the detected current (i.e. the first signal S1 representative of the same) exceeds the pre-set threshold value TR again, a condition of the presence of water in the cylinder is identified (corresponding to the water detection mode described in the system 10 and/or the device 10').

More precisely, said identification of the condition of the presence of water in the cylinder occurs when the maximum value of the first signal S1 exceeds said threshold value TR for a predetermined first number of combustion cycles occurring in a predetermined interval of time.

Preferably, the first number of combustion cycles is a consecutive number of cycles.

Note that, preferably, the first number of combustion cycles corresponds to the one in the description of the system 10.

Thus, said first number of cycles is preferably from 1 to 10.

According to a further aspect of the invention, upon said identification of the condition of the presence of water in the cylinder, both the monitoring method and the control method comprise an elimination of said changes of one or more previously occurring parameters, so as to bring said one or more parameters back to the reference values REF.

Advantageously, in this way, the corrections made erroneously to the parameters in the hypothesis of a knock event in the engine are eliminated.

Such feature is particularly important in the control method according to the present invention, as the change in the control parameter of the previously occurring combustion could have a negative impact on the efficiency of the engine; such effect can thus be "cancelled" bringing the value of the control parameter back to the base map value.

Furthermore, the method preferably comprises detecting an absence of water from the engine cylinder when, upon said detection of the presence of water, the maximum value of the first signal S1 (in the thermal step) is lower than said threshold value TR for a predetermined second number of consecutive combustion cycles.

Preferably, such predetermined second number of combustion cycles is greater than the predetermined first number of combustion cycles, preferably at least five times greater.

Advantageously, in this way, the deactivation of the water detection mode requires a sufficiently long temporal transient to guarantee the stability of the control.

The invention achieves the fixed objects and derives important advantages.

In fact, due to the method and system according to the present invention, it is possible to identify the presence of water inside one or more engine cylinders, in a simple and reliable manner.

Moreover, due to the compatibility check between the value of the signal representative of the ionization current in the thermal step and the presence of water in the cylinders, it is possible to distinguish, in a simple and immediate manner, between such event and a potential knock phenomenon or another cause of signal saturation, by operating in a different manner.

More precisely, due to the system according to the present invention, after detecting the presence of water in the engine, it is possible to eliminate all of the previous corrections and, above all, stop the knock control, preventing an excessive knock count from causing the system to implement inopportune and potentially harmful corrections of the ignition timing.

The invention claimed is:

1. A monitoring method for monitoring a presence of water in a cylinder of an internal combustion engine provided with an ignition coil comprising circuitry operatively connected with a spark plug; the method comprising, for each engine cycle, the following steps carried out in succession:
    detecting an ionization current that is generated in the cylinder in a predetermined time interval of a combustion cycle;
    generating a first signal representative of said detected ionization current;
    comparing a maximum value of said first signal with a pre-set threshold value;
    changing a value of one or more parameters related with said first signal with respect to corresponding reference values when said maximum value of the first signal exceeds said pre-set threshold value in order to reduce the maximum value of said first signal in said predetermined time interval of a successive combustion cycle;
    identifying the presence of water in the cylinder when said maximum value of the first signal exceeds said pre-set threshold value for a predetermined first number of combustion cycles occurring within a predetermined period of time;
    upon identifying the presence of water in the cylinder, subsequently identifying an absence of water in the cylinder when said maximum value of the first signal is lower than said pre-set threshold value for a predetermined second number of successive combustion cycles.

2. The monitoring method according to claim 1, wherein the cycles of said predetermined first number of combustion cycles are consecutive.

3. The monitoring method according to claim 2, wherein said predetermined first number of combustion cycles is at least two.

4. The monitoring method according to claim 2, wherein said predetermined second number of successive combustion cycles is greater than the predetermined first number of combustion cycles.

5. The monitoring method according to claim 1, wherein said one or more parameters comprises at least one coefficient of amplification of the detected ionization current.

6. The monitoring method according to claim 1, and further comprising, upon said identification of the presence of water in the cylinder, eliminating said previous changes in said one or more parameters, so as to bring said one or more parameters back to the reference values.

7. The monitoring method according to claim 1, wherein said predetermined time interval is defined by a thermal phase of a combustion cycle.

8. A control method for controlling a combustion in a cylinder of an internal combustion engine provided with a related ignition coil comprising circuitry operatively connected with a spark plug; the control method comprising, for each engine cycle, the following steps carried out in succession:
    detecting an ionization current that is generated in the cylinder in a predetermined time interval of a combustion cycle;
    generating a first signal representative of said detected ionization current;
    comparing a maximum value of said first signal with a pre-set threshold value;
    making changes to a value of one or more combustion control parameters with respect to corresponding reference values when said maximum value of the first signal exceeds said pre-set threshold value in order to reduce the maximum value of the ionization current in said predetermined time interval of a successive combustion cycle;
    identifying a condition of presence of water in the cylinder when said maximum value of the first signal detected exceeds said pre-set threshold value for a predetermined first number of combustion cycles occurring within a predetermined period of time, wherein,
    eliminating the changes to the value of the one or more combustion control parameters upon said identification of the condition of presence of water in the cylinder, as to bring said one or more parameters back to the reference values;
    keeping the value of the one or more parameters equal to the corresponding reference value in successive combustion cycles until identification of an absence of water in the cylinder.

9. The control method according to claim 8, wherein the one or more combustion control parameter is defined by an ignition timing; said step of making changes to the value of the one or more combustion control parameters includes reducing an advance in the ignition timing by a predetermined angle for the successive combustion cycles.

10. The control method according to claim 8, wherein said step of changing one or more parameters comprises the following substeps:
identifying a heavy knock inside the cylinder when the maximum value of the first signal exceeds said pre-set threshold value;
changing said one or more combustion control parameters following said identification of the heavy knock.

11. A monitoring system for monitoring a cylinder of an internal combustion engine, said system being operatively connected with an ignition coil comprising a circuitry operatively connected with a spark plug inserted in said cylinder to generate an ignition spark, said monitoring system comprising:
a detection circuit configured to detect an ionization current, which is generated in the cylinder in a predetermined time interval during a combustion cycle and generate a first signal representative of said detected ionization current;
a processing unit operatively connected with said ionization circuit, arranged to receive said first signal and configured for:
comparing, for each combustion cycle, a maximum value of the first signal with a pre-set threshold value;
changing a value of one or more parameters related with said first signal with respect to corresponding reference values when said maximum value of the first signal exceeds said pre-set threshold value in order to reduce a maximum value of the first signal in said predetermined time interval of a successive combustion cycle;
activating a water detection mode for the detection of water in the cylinder when said maximum value of the first signal exceeds said pre-set threshold value for a predetermined first number of successive combustion cycles;
wherein, following said activation of the water detection mode, the processing unit is programmed to:
bring the value of said one or more parameters associated with the first signal back to the corresponding reference values;
keep the value of said one or more parameters of the combustion cycle equal to the corresponding reference values independently of any further exceedances of the pre-set threshold value by the first signal in successive combustion cycles.

12. The monitoring system according to claim 11, wherein said processing unit is configured to deactivate said water detection mode when said maximum value of the first signal in said predetermined time interval of each combustion cycle is lower than said pre-set threshold value for a predetermined second number of successive combustion cycles.

13. The monitoring system according to claim 12, wherein said predetermined second number of consecutive combustion cycles is greater than said predetermined first number of consecutive combustion cycles.

14. The monitoring system according to claim 11, wherein said detection circuit comprises at least one selectively controllable amplification module for amplification of the first signal; said processing unit being configured to control said amplification module in order to reduce the maximum value of the first signal in one of the successive combustion cycles when said maximum value of the first signal exceeds said pre-set threshold value in said predetermined interval of the combustion cycle.

15. A combustion control device for a cylinder of an internal combustion engine, said combustion control device including the monitoring system according to claim 11 and also being operatively connected with the ignition coil, wherein said one or more parameters are combustion controlling parameters.

16. The combustion control device according to claim 15, wherein said processing unit is configured to activate a heavy knock correction mode for correction of a heavy knock when said maximum value of the first signal exceeds said pre-set threshold value.

17. The combustion control device according to claim 16, wherein said combustion cycle control parameters comprise an angle of rotation of a drive shaft of the engine and/or a position of a piston of the engine, both representative of an ignition timing of the respective cylinder, wherein, in the heavy knock correction mode, said processing unit is configured to modify said angle of rotation or said position of the piston with respect to the corresponding reference values whenever said maximum value of the ionization current detected in said predetermined interval of the combustion cycle exceeds said pre-set threshold value, in order to reduce an advance in the ignition timing for the successive combustion cycle.

18. An ignition apparatus for an internal combustion engine having a plurality of cylinders, the ignition apparatus comprising:
a plurality of ignition coils proportional in number to the cylinders, each of the ignition coils including a circuitry operatively connected with a spark plug inserted in the respective cylinder to generate an ignition spark;
the combustion control device according to claim 15,
wherein the processing unit is configured to activate the water detection mode when the exceeding of the pre-set threshold value by the maximum value of the first signal is identified in multiple ones of the cylinders simultaneously or in rapid succession.

19. An ignition apparatus for an internal combustion engine having a plurality of cylinders, the ignition apparatus comprising:
a plurality of ignition coils proportional in number to the cylinders, each of the ignition coils including a circuitry operatively connected with a spark plug inserted in the respective cylinder to generate an ignition spark;
the monitoring system according to claim 11,
wherein the processing unit is configured to activate the water detection mode when the exceeding of the pre-set threshold value by the maximum value of the first signal is identified in multiple ones of the cylinders simultaneously or in rapid succession.

* * * * *